(12) United States Patent
Hu

(10) Patent No.: US 10,506,063 B2
(45) Date of Patent: Dec. 10, 2019

(54) METHOD AND APPARATUS FOR CACHING USER GENERATED CONTENT MESSAGES

(71) Applicant: Tencent Technology (Shenzhen) Company Limited, Shenzhen, Guangdong (CN)

(72) Inventor: Mingren Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 767 days.

(21) Appl. No.: 14/826,372

(22) Filed: Aug. 14, 2015

(65) Prior Publication Data
US 2015/0358419 A1     Dec. 10, 2015

Related U.S. Application Data

(63) Continuation of application No. PCT/CN2014/080731, filed on Jun. 25, 2014.

(30) Foreign Application Priority Data

Jun. 26, 2013  (CN) .......................... 2013 1 0260882

(51) Int. Cl.
G06F 15/16     (2006.01)
H04L 29/08     (2006.01)
H04L 12/801    (2013.01)

(52) U.S. Cl.
CPC .......... H04L 67/2842 (2013.01); H04L 47/12 (2013.01); H04L 67/2852 (2013.01)

(58) Field of Classification Search
CPC .. H04L 67/2842; H04L 47/12; H04L 67/2852
(Continued)

(56) References Cited

U.S. PATENT DOCUMENTS 6,256,747 B1 *  7/2001  Inohara ............... H04L 41/0893
                                                        709/201
6,542,964 B1 *  4/2003  Scharber ................. H04L 29/06
                                                        711/122
(Continued)

FOREIGN PATENT DOCUMENTS

CN      101582876 A     11/2009
CN      101667198 A      3/2010
(Continued)

OTHER PUBLICATIONS

Notification of the First Office Action of Chinese application No. 201310260882.0, dated Jun. 1, 2017.
(Continued)

*Primary Examiner* — Anthony Mejia
(74) *Attorney, Agent, or Firm* — Brinks Gilson & Lione

(57) ABSTRACT

A method for caching User Generated Content (UGC) messages performed at a server is provided, in which first and second attribute information of an UGC message is acquired, a function value corresponding to the first attribute information is obtained based on the first attribute information and a preset first function, a function value corresponding to the second attribute information is obtained based on the second attribute information and a preset second function, the UGC message is added to the cache memory of the server when it is determined from the function values corresponding to the first and the second attribute information that the first and second attribute information of the UGC message meets a preset condition. Additionally, an apparatus and a server for caching UGC messages are also provided.

14 Claims, 2 Drawing Sheets

(58) Field of Classification Search
USPC .......................................................... 709/219
See application file for complete search history.

(56) References Cited

U.S. PATENT DOCUMENTS

| | | | | |
|---|---|---|---|---|
| 7,454,457 | B1* | 11/2008 | Lowery | H04L 43/0852 709/203 |
| 7,673,099 | B1* | 3/2010 | Beaverson | G06F 12/0866 711/118 |
| 7,860,993 | B2* | 12/2010 | Chintala | H04N 7/17336 709/214 |
| 7,899,869 | B1* | 3/2011 | Anderson | G06Q 10/10 709/206 |
| 8,364,666 | B1* | 1/2013 | Katzir | H04L 63/306 707/723 |
| 8,719,302 | B2* | 5/2014 | Bailey | G06F 16/95 707/790 |
| 9,037,577 | B1* | 5/2015 | Saylor | G06Q 50/01 707/725 |
| 9,081,777 | B1* | 7/2015 | Krawczyk | G06F 16/41 |
| 9,397,974 | B1* | 7/2016 | Gross | H04L 51/32 |
| 9,483,529 | B1* | 11/2016 | Pasoi | H04L 51/32 |
| 2002/0071422 | A1* | 6/2002 | Amicangioli | H04L 29/06 370/351 |
| 2002/0078300 | A1* | 6/2002 | Dharap | G06F 16/9574 711/133 |
| 2002/0087797 | A1* | 7/2002 | Adrangi | G06F 12/0888 711/133 |
| 2003/0200266 | A1* | 10/2003 | Henry | H04L 29/06 709/206 |
| 2005/0204001 | A1* | 9/2005 | Stein | G06Q 10/107 709/206 |
| 2006/0026236 | A1* | 2/2006 | Scian | G06Q 10/107 709/206 |
| 2006/0053203 | A1* | 3/2006 | Mijatovic | H04L 51/12 709/206 |
| 2007/0073813 | A1* | 3/2007 | Kamat | H04L 51/22 709/206 |
| 2009/0248813 | A1* | 10/2009 | Sawhney | G06Q 10/107 709/206 |
| 2010/0082415 | A1* | 4/2010 | Begue | G06Q 30/0208 705/14.11 |
| 2010/0095331 | A1* | 4/2010 | Hilt | H04N 21/2225 725/87 |
| 2010/0146038 | A1* | 6/2010 | Hajiaghayi | H04L 67/2842 709/203 |
| 2010/0332992 | A1* | 12/2010 | Donoho | G06Q 30/02 715/736 |
| 2011/0055264 | A1* | 3/2011 | Sundelin | G06Q 10/107 707/776 |
| 2011/0093705 | A1 | 4/2011 | Liu | |
| 2011/0119444 | A1* | 5/2011 | DeCusatis | G06F 16/24552 711/118 |
| 2011/0282727 | A1* | 11/2011 | Phan | G06Q 10/10 705/14.36 |
| 2012/0072835 | A1* | 3/2012 | Gross | G06Q 10/10 715/243 |
| 2012/0311067 | A1* | 12/2012 | Fremantle | H04L 67/26 709/213 |
| 2013/0177308 | A1* | 7/2013 | Rope | H04B 10/40 398/25 |
| 2015/0207677 | A1* | 7/2015 | Choudhury | H04L 41/0806 370/254 |
| 2016/0092354 | A1* | 3/2016 | Steely, Jr. | G06F 12/0811 711/141 |

FOREIGN PATENT DOCUMENTS

| | | |
|---|---|---|
| CN | 102681998 A | 9/2012 |
| CN | 103118122 A | 5/2013 |
| WO | 2014127658 A1 | 8/2014 |

OTHER PUBLICATIONS

International Search Report in international application No. PCT/CN2014/080731, dated Oct. 14, 2014.
English Translation of the Written Opinion of the International Search Authority in international application No. PCT/CN2014/080731, dated Oct. 14, 2014.

* cited by examiner

METHOD AND APPARATUS FOR CACHING USER GENERATED CONTENT MESSAGES

CROSS REFERENCE TO RELATED APPLICATIONS

The present patent application is a U.S. continuation application under 35 U.S.C. § 111(a) claiming priority under 35 U.S.C. §§ 120 and 365(c) to International Application No. PCT/CN2014/080731 filed on Jun. 25, 2014, which claims priority of the Chinese patent application No. 201310260882.0, entitled "METHOD AND APPARATUS FOR CACHING USER GENERATED CONTENT MESSAGES" and filed by applicant Tencent Technology (Shenzhen) Co., Ltd on Jun. 26, 2013, each of which is incorporated into the present application by reference in its entity.

BACKGROUND

Caching media is a well-known technique for improving access times and optimizing bandwidth usage in telecommunication or enterprise networks. A cache uses a block of memory, such as disk space or other storage device, to temporarily store a copy of some data that is likely to be needed in the future.

When cache clients (i.e., entities that need data, such as computers or mobile terminals) try to access some data, they check the cache first. If the necessary data is available in the cache ("cache hit") then the cached copy is used. If the data is not found in the cache ("cache miss") then it is downloaded from the original source. In the case if a cache miss, a copy of the data is temporarily stored in the cache, for later access.

When new data is stored in a cache, often some previously cached data has to be removed in order to free up storage capacity. The strategies that determine what of the old data should be removed are called caching algorithms or caching replacement algorithms. Any improvements in caching which increases accuracy is of great benefit. This will provide more hits and fewer misses, which improves performance and reduces network congestion.

SUMMARY

This disclosure in some aspects relates to a method and apparatus for caching User Generated Content (UGC) messages, capable of improving caching accuracy of UGC messages.

According to an aspect of the disclosure, a method for caching UGC messages is provided, which includes steps as follows: at a server, acquiring first and second attribute information of an UGC message; obtaining, based on the first attribute information and a preset first function, a function value corresponding to the first attribute information; obtaining, based on the second attribute information and a preset second function, a function value corresponding to the second attribute information; and adding the UGC message to the cache memory of the server when it is determined from the function values corresponding to the first and the second attribute information that the first and second attribute information of the UGC message meets a preset condition.

According to another aspect of the disclosure, an apparatus for caching UGC messages is provided, which includes: a first acquisition portion, configured to acquire first and second attribute information of an UGC message; a setting portion, configured to set a first function and a second function; a second acquisition portion, configured to obtain a function value corresponding to the first attribute information based on the first attribute information and the first function, and to obtain a function value corresponding to the second attribute information based on the second attribute information and the second function; a determination portion, configured to determine from the function values corresponding to the first and the second attribute information whether the first and second attribute information of the UGC message meets a preset condition, and if so, notify a sending portion to send the UGC message to a cache memory of a server; and the sending portion, configured to send the UGC message to the cache memory of the server.

According to yet another aspect of the disclosure, a server is provided, which includes a processor and a memory coupled to the processor and including instructions that when executed, cause the processor to perform the following method: acquiring first and second attribute information of an UGC message; obtaining, based on the first attribute information and a preset first function, a function value corresponding to the first attribute information; obtaining, based on the second attribute information and a preset second function, a function value corresponding to the second attribute information; and adding the UGC message to the cache memory of the server when it is determined from the function values corresponding to the first and the second attribute information that the first and second attribute information of the UGC message meets a preset condition.

According to yet another aspect of the disclosure, a non-transitory computer-readable storage medium is provided, which includes instructions that, when executed, cause the processor to perform the following method: acquiring first and second attribute information of an UGC message; obtaining, based on the first attribute information and a preset first function, a function value corresponding to the first attribute information; obtaining, based on the second attribute information and a preset second function, a function value corresponding to the second attribute information; and adding the UGC message to the cache memory of the server when it is determined from the function values corresponding to the first and the second attribute information that the first and second attribute information of the UGC message meets a preset condition.

This section is intended to provide an overview of subject matter of the present patent application. It is not intended to provide an exclusive or exhaustive explanation of the invention. The detailed description is included to provide further information about the present patent application.

DESCRIPTION OF THE DRAWINGS

These and other sample aspects of the disclosure will be described in the detailed description and the claims that follow, and in the accompanying drawings, wherein:

Figure 1:
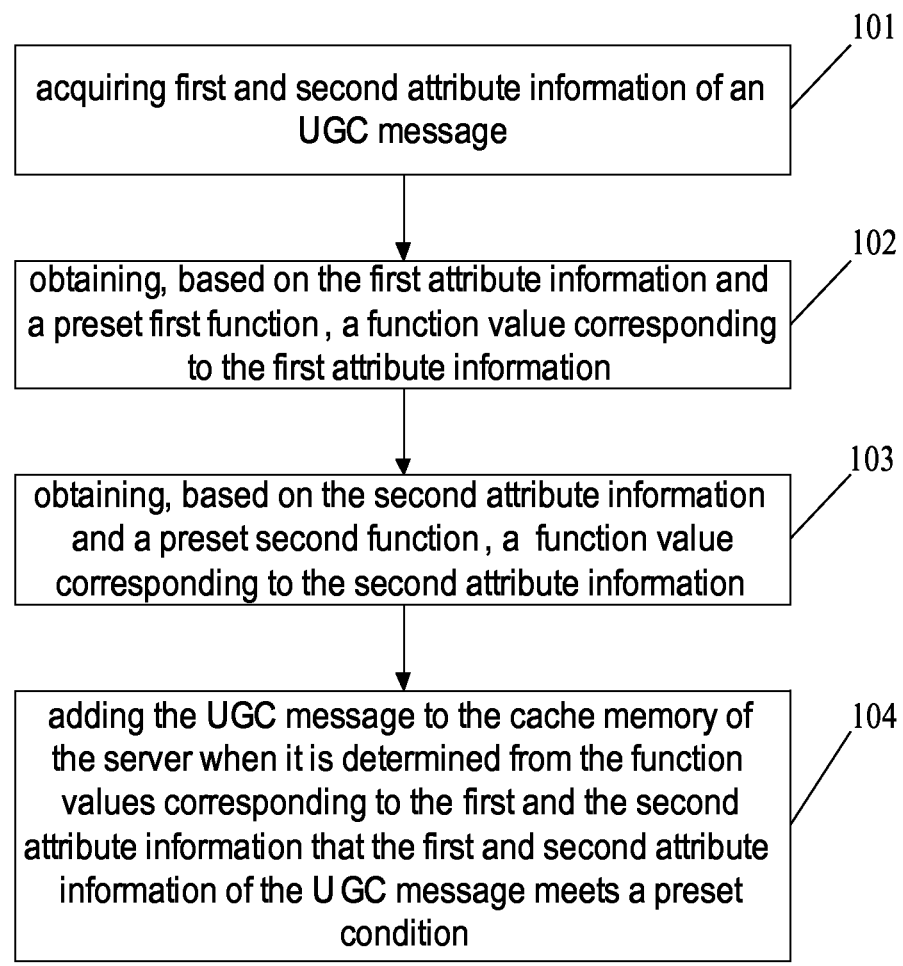
FIG. 1 is a flowchart of a method for caching UGC messages according to some embodiments.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Reference throughout this specification to "an example," "an embodiment," or the like in the singular or plural means that one or more particular features, structures, or characteristics described in connection with an embodiment is included in at least one embodiment of the present disclosure. Thus, the appearances of the phrases "an example," "an embodiment," or the like in the singular or plural in various places throughout this specification are not necessarily all referring to the same embodiment. Furthermore, the particular features, structures, or characteristics may be combined in any suitable manner in one or more embodiments.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes"in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

For social platforms providing User Generated Content (UGC) service, such as Microblog, their servers receive from users a huge number of UGC messages every day. Some of those messages would be read by users for many times. So, for those servers, UGC messages that are likely to be needed by users can be stored in their cache memory to improve their response rate.

Generally, when a new UGC message needs to be stored in a cache, often some cached UGC messages have to be removed to free up storage capacity. One strategy can be used to determine what of the old UGC messages should be removed is a caching mechanism based on the frequency of reading. For example, a server can maintain a counter for every UGC message it cached. When some UGC messages need to be removed from cache memory, those having minimum reading times in their counters will be deleted.

But this mechanism has also some problems.

One is residual of old message in the cache memory. Old UGC messages always keep remained while new UGC messages are deleted since the reading times of the old UGC messages accumulated over time and there is no chance for new messages to accumulate their reading times.

Another one is the need to give some extra storage space for those counters to store their counting numbers. This results in excessive use of cache space.

In view of this, technology for caching a UGC message should be explored to reduce the load of a server disk, solve the problem of residual of old message in a cache and optimize a cache space.

By analyzing the message reading condition of users, the following features with respect to reading quantity of messages and the time of messages generated are found:

1:the reading demands for the messages generated on that day are very large, and account for about 30% of the total reading demands on that day;

2:the reading demands for the messages generated over the past 100 days decline rapidly; and 3:the reading demands for the messages generated 100 days ago account for about 26% of the total reading demands on that day.

All the messages read in a day have the following features according to their reading times and their proportion in the total reading demands:

1:about 50% of the messages are read once only in a day and account for about 4% of the total reading demands;

2:about 16% of the messages are read for two times in a day and account for about 3% of the total reading demands; and 3:about 34% of the messages are read for more than or equal to 3 times in a day and account for about 93% of the total reading demands.

Therefore, the cache can alleviate 93% of the reading demands of the system only if it can store 34% of the messages.

Referring to FIG. 1, which is a flowchart of a method for caching UGC messages according to some embodiments. In an example, this method can be performed in a server including a cache memory and a disk, like a Microblog server.

In Step 101, first and the second attribute information of an UGC message may be acquired.

In an example, before the first and the second attribute information of the UGC message are acquired, the method can further include: a request message for reading the UGC message is received and the UGC message is obtained from the disk of the server when the UGC message cannot be retrieved from the cache memory of the server.

In an example, when the request message for reading the UGC message is received, the cache memory of the server can be first retrieved to find the UGC message. If the UGC message cannot be retrieved from the cache memory of the server, the disk of the server then can be retrieved to find the UGC message.

The first attribute information can be time attribute information, including but not limited to the time of the UGC message generated.

The second attribute information can be state attribute information, including various sub-state attribute information. For example, the first sub-state attribute information of the UGC message can represent the UGC is in a normal state or in a deleted state. For example, the second sub-state attribute information of the UGC message can represent the UGC message is in an air-interface forwarded state, in an original state, in a comment state or in a broadcast state etc. For example, the third sub-state attribute information of the UGC message can be priority message. In an example, UGC messages can be classified into different priority classes based on the impact factor of different generators. UGC messages published by different message generators correspond to different priority classes, including first-class message, second-class message and the like. The message generators can be any users who can generate messages, such as an original generator, a commentator or a broadcaster of messages. The impact factor of a message generator includes and is not limited to the numbers of fans and friends of the message generator.

In Step 102, a function value corresponding to the first attribute information may be obtained according to the first attribute information and a preset first function.

In an example, the first function corresponding to the first attribute information can be a preset one. For example, the first function can be a piecewise function related to the time attribute as follows.

$$F(t) = \begin{cases} 50(t \leq 1) \\ 80(1 < t \leq 10) \\ 50(10 < t \leq 100) \\ 20(100 < t < 365) \\ 70(t = 365) \end{cases} \quad (1)$$

In Formula (1), when t<=1, namely, the message is generated on that day (including that day), the function value is 50. When 1<t<=10, namely, the message was generated 1-10 days before that day, (including 10 days), the function value is 80. When 10<t<=100, namely, the message was generated 10-100 days before that day, (including 100 days), the function value is 50. When 100<t<365, namely, the message was generated 100-365 days before that day, the function value is 20; and when t=365, the function value is 70.

In an example, the function value corresponding to the first attribute information can obtained based on the acquired first attribute information (e.g., the time of the message generated) and the first preset function. For example, when the message was generated two days ago, namely, the first attribute information t of the message is 2, a corresponding function value F(t)=80 can be obtained according to Formula (1).

In Step 103, a function value corresponding to the second attribute information may be obtained based on the second attribute information and a preset second function.

In an example, the second function corresponding to the second attribute information can be a preset one. For example, the second function can be a piecewise function related to the state attribute of the message and include sub-functions corresponding to various sub-state attribute information.

For example, the first sub-state attribute can represent the UGC message is in a normal state or in a deleted state, as shown in Formula (2):

$$F(x) = \begin{cases} 10(x = 1) \\ -200(x = 0) \end{cases} \quad (2)$$

In Formula (2), when the message is in the normal state, i.e., x=1, the function value corresponding to the normal state is 10. When the message is in the deleted state, i.e., x=0, the function value corresponding to the deleted state is -200.

In an example, the second sub-state attribute can represent the UGC message is in an air-interface forwarded state, in a broadcast state, in an original state or in a comment state of the message, as shown in Formula (3):

$$F(x) = \begin{cases} 0(x = 2) \\ 10(x = 3) \\ 20(x = 4) \\ -10(x = 5) \end{cases} \quad (3)$$

In Formula (3), when the message is in the air-interface forwarded state, i.e., x=2, the function value corresponding to the air-interface forwarded state is 0. When the message is in the broadcast state, i.e., x=3, the function value corresponding to the broadcast state is 10. When the message is in the original state, i.e., x=4, the function value corresponding to the original state is 20. When the message is in the comment state, i.e., x=5, the function value corresponding to the comment state is -10.

In an example, the third sub-state attribute can be one related to the impact factor of the message generator, as shown in Formula (4):

$$F(x) = \begin{cases} 85(x = a) \\ 60(x = b) \\ 35(x = c) \\ 20(x = d) \end{cases} \quad (4)$$

The message can be classified into different priority classes based on impact factors of different message generators, and the message generators can be any users who can generate messages, such as an original generator, a commentator or a broadcaster of the messages. For example, in Formula (4), messages can be classified into four classes: a, b, c and d respectively. Message generators can be sorted in a descending order of impact factors. For example, message generators having a maximum impact factor can be sorted into class a and those having a minimum impact factor can be sorted into class d. For example, message generators can be sorted into four classes in a descending order of their numbers of fans or friends. For example, message generators having a maximum number of fans or friends can be sorted into class a and those having a minimum number of fans or friends can be sorted into class d. For example, the function values corresponding to the message generators of classes a, b, c and d can be respectively 85, 60, 35 and 20. In an example, a priority list can be generated based on the impact factors of the message generators to record the corresponding relationship between the name and the class of the generator, and this list can be updated periodically.

In an example, the function value corresponding to the second attribute information can be obtained based on the acquired second attribute information, i.e., the state, priority and other information of the message. For example, when the message is in the normal state or in the broadcast state, a function value F(x)=10 can be obtained according to Formula (2). When the message is classified into the priority class c, a function value F(x)=35 can be obtained according to Formula (3).

In Step 104, the UGC message may be added to the cache memory when it is determined from the function values corresponding to the first and the second attribute information that first and second attribute information meets a preset condition.

In an example, determining whether the first and second attribute information of the UGC message meets the preset condition can be performed by judging whether a sum of the function values corresponding to the first and second attribute information is greater than a preset threshold, and if yes, it is determined that the first and second attribute information of the UGC message meets the preset condition.

When the judgment result is negative, it is determined that the first and second attribute information does not meet the preset condition.

In an example, the function value corresponding to the first attribute information can be that corresponding to the initial publishing time attribute information of the message, and the function value corresponding to the second attribute information can be an accumulation of function values of sub-functions corresponding to the sub-state attribute information.

In an example, a sum of function values corresponding to the first and the second attribute information can be calculated through the following formula:

$$F=F(t)j+\Sigma F(x)i \quad (5)$$

In Formula (5), F(t)j is the function value corresponding to time attribute j at moment t; F(x)i is the function value of the sub-function corresponding to sub-state attribute i in state x; and $\Sigma F(x)$ i is the cumulative sum of function values of sub-functions corresponding to a plurality of sub-state attributes i in state x.

Take the functions set in Formulas (1) and (4) as an example, it is assumed that the message was generated two days ago, namely, the first attribute information t of the message is 2, a corresponding function value F(t)=80 can be obtained according to Formula (1). When the message is in the normal state, a function value F(x)=10 can be obtained according to Formula (2). When the message is in the broadcast state, a function value F(x)=10 can be obtained according to Formula (3). When the message is classified into a priority class c, a function value F(x)=35 can be obtained according to Formula (4). As such, the sum of function values corresponding to the first and the second attribute information obtained according to Formula (5) is 80+10+10+35=135.

When the preset threshold is 100, the obtained sum 135 of the function values is greater than the preset threshold 100, so the current UGC message would meet the preset condition and the message would be added to the cache memory.

When the preset threshold is 150, the obtained sum 135 of the function values is less than the preset threshold 150, so the current UGC message would not meet the preset condition and the message would not be added to the cache memory.

Comparing the sum of function values with the threshold has the following advantages: when a UGC message needs to be added to the cache, whether the message should be added to the cache memory or not can be determined immediately by acquiring the function values corresponding to the first and the second attribute information and comparing the function values with the preset threshold. Since no extra cache space is needed to store the reading times and other information of the UGC messages, cache space can be saved and more UGC messages can be added to the cache memory.

In an example, the method of FIG. 1 can further include: the UGC message added to the cache memory of the server may be returned to the client application.

In an example, the method of FIG. 1 can further include: the UGC message obtained from the disk of the server may be returned to the client application.

In an example, when a request message of reading the UGC message is received, the cache memory is retrieved first to find the UGC messages, and the UGC message retrieved from the cache memory can be directly returned to the client application. When the UGC message cannot be retrieved from the cache memory of the server, the disk of the server then can be retrieved to find the UGC message and whether the UGC message meets the preset condition of being added into the cache memory can be judged according to the steps above. When the UGC message meets the present condition, the UGC message obtained from the disk can be added to the cache memory and returned to the client application. When the UGC message does not meet the preset condition, the UGC message obtained from the disk can be returned to the client application.

In an example, the method can further comprise: prior to adding the UGC message to the cache memory of the server, determining whether the cache memory reaches a preset capacity threshold. In a case that the cache memory reaches the preset capacity threshold, a hash value corresponding to the UGC message can be calculated based on Identifier (ID) of the UGC message, the cache memory can be retrieved to find all the UGC messages having a hash value equal to the calculated hash value, for each of the retrieved UGC messages, a sum of function values of the retrieved UGC message can be calculated, and an UGC message having a minimum sum of function values can be deleted from the cache memory.

Since the capacity of the cache memory is limited, the first attribute information of the message, i.e., the time attribute information, will change over time, and more and more UGC messages will be added to the cache, it is necessary to clean the UGC message in the cache and delete the UGC message having the same hash value and the minimum sum of function values in the cache in order to add a new UGC message when the cache memory reaches a certain capacity threshold.

As discussed above, according to some of the disclosed embodiments, by, at a server, acquiring first and second attribute information of an UGC message, obtaining based on the first attribute information and a preset first function a function value corresponding to the first attribute information, obtaining based on the second attribute information and a preset second function a function value corresponding to the second attribute information, the UGC message can be added to the cache memory of the server when it is determined from the function values corresponding to the first and the second attribute information that the first and second attribute information of the UGC message meets a preset condition. As such, the problem of residual of old data caused by accumulated reading times can be solved, and more UGC messages which are generated on that day and accessed very frequently are remained in the cache through the added time and state factors of the message. Accordingly, the load of the server disk is reduced and the accessing features of the UGC message can adapt better. Additionally, the problem that extra cache space is needed to record the reading times of the UGC message is also solved, the cache space is saved and more UGC messages can be added to the cache.

The disclosure is further described below with a microblog scenario as an embodiment in detail.

In an example, the first function corresponding to the first attribute can be a preset one, exemplified by the function in Formula (1), the second function corresponding to the second attribute can also be a preset one, exemplified by the functions in Formulas (2) to (4); and a threshold 100 is preset, namely, when the sum of function values is greater than 100, the message is added to the cache memory.

First Embodiment

If user A, who is a famous person and has an impact factor of class a, publishes a new microblog message originally generated thereby on that day, a function value $F(t)=50$ corresponding to the time attribute information is obtained according to Formula (1) because the microblog is generated on that day. A function value $F(x)=10$ corresponding to the first sub-state attribute is obtained according to Formula (2) because the microblog is in the normal state. A function value $F(x)=20$ corresponding to the second sub-state attribute is obtained according to Formula (3) because the microblog is originally generated. A function value $F(x)=85$ corresponding to the third sub-state attribute is obtained according to Formula (4) because the microblog is classified into a priority class a. All the function values are accumulated according to Formula (5) to obtain a sum of function values $50+10+20+85=165$, which is greater than 100, so the microblog message published by user A is added to the cache memory.

Second Embodiment

If user B, who has an impact factor of class b, broadcasts a microblog message published 3 days ago, a function value $F(t)=80$ corresponding to the time attribute information is obtained according to Formula (1). A function value $F(x)=10$ corresponding to the first sub-state attribute is obtained according to Formula (2) because the microblog is in the normal state. A function value $F(x)=10$ corresponding to the second sub-state attribute is obtained according to Formula (3) because the microblog is in the broadcast state. A function value $F(x)=60$ corresponding to the third sub-state attribute is obtained according to Formula (4) because the microblog is classified into a priority class b. All the function values are accumulated according to Formula (5) to obtain a sum of function values $80+10+10+60=160$, which is greater than 100, so the microblog message published by user B is added to the cache memory.

Third Embodiment

If user C, who is a famous person and has an impact factor of class a, publishes a new microblog message originally generated thereby on that day but also deletes it on that day, a function value $F(t)=50$ corresponding to the time attribute information is obtained according to Formula (1). A function value $F(x)=-200$ corresponding to the first sub-state attribute is obtained according to Formula (2) because the microblog is in the deleted state. A function value $F(x)=20$ corresponding to the second sub-state attribute is obtained according to Formula (3) because the microblog is originally generated. A function value $F(x)=85$ corresponding to the third sub-state attribute is obtained according to Formula (4) because the microblog is classified into a priority class a. All the function values are accumulated according to Formula (5) to obtain a sum of function values $50(-200)+20+85=-45$, which is less than 100, so the microblog message published by user C is not added to the cache.

Fourth Embodiment

If user D, who has an impact factor of class d, comments a microblog message published 20 days ago, a function value $F(t)=50$ corresponding to the time attribute information is obtained according to Formula (1). A function value $F(x)=10$ corresponding to the first sub-state attribute is obtained according to Formula (2) because the microblog is in the normal state. A function value $F(x)=-10$ corresponding to the second sub-state attribute is obtained according to Formula (3) because the microblog is in the comment state. A function value $F(x)=25$ corresponding to the third sub-state attribute is obtained according to Formula (4) because the microblog is classified into a priority class d. All the function values are accumulated according to Formula (5) to obtain a sum of function values $50+10+(-10)+25=75$, which is less than 100, so the microblog message commented by user D cannot be added to the cache.

Fifth embodiment

If user E, who has an impact factor of class c, forwards a microblog message published 120 days ago through an air interface, a function value $F(t)=20$ corresponding to the time attribute information is obtained according to Formula (1). A function value $F(x)=10$ corresponding to the first sub-state attribute is obtained according to Formula (2) because the microblog is in the normal state. A function value $F(x)=0$ corresponding to the second sub-state attribute is obtained according to Formula (3) because the microblog is in the air-interface forwarded state. A function value $F(x)=35$ corresponding to the third sub-state attribute is obtained according to Formula (4) because the microblog is classified into a priority class c. All the function values are accumulated according to Formula (5) to obtain a sum of function values $20+10+0+35=65$, which is less than 100, so the microblog message forwarded by user E through the air interface cannot be added to the cache.

Figure 2:
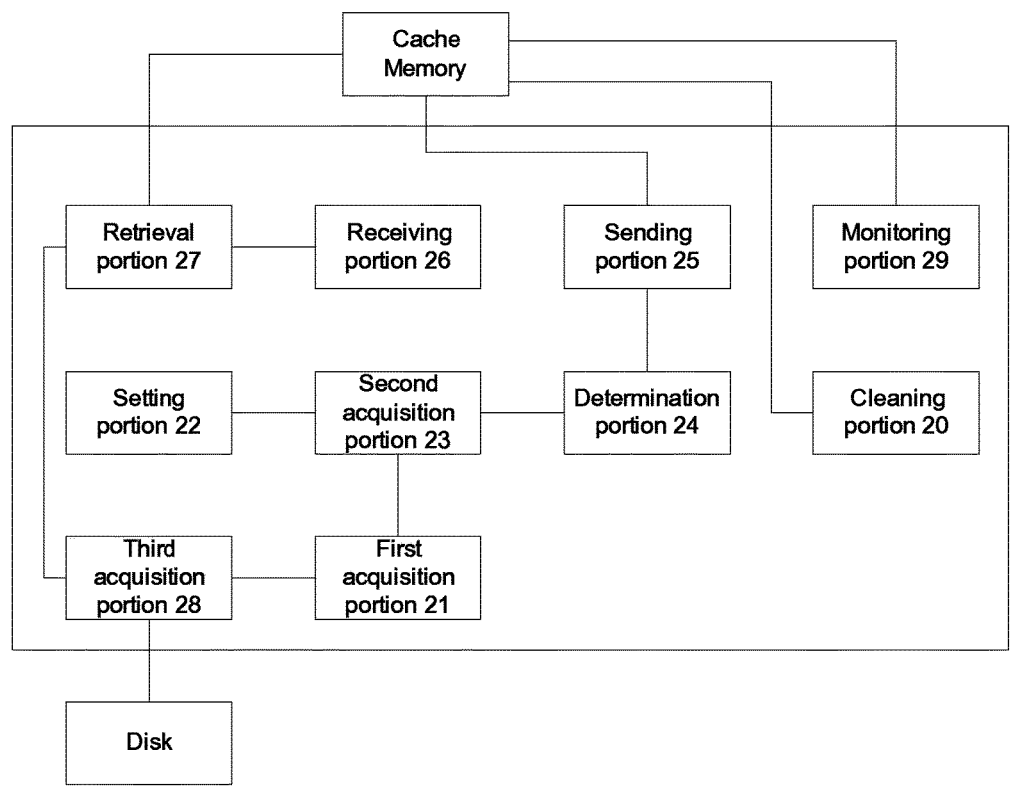
FIG. 2 is a block diagram illustrating an apparatus for caching UGC messages according to some embodiments.

Referring to FIG. 2, which is a block diagram illustrating an apparatus for caching UGC messages according to some embodiments. The apparatus may be included in a server including a cache memory and a disk, and may adopt the method illustrated in FIG. 1. For example, the apparatus can include a first acquisition portion 21, a setting portion 22, a second acquisition portion 23, a determination portion 24 and a sending portion 25.

The first acquisition portion 21 can acquire first and the second attribute information of an UGC message.

The setting portion 22 can set a first function and a second function.

The second acquisition portion 23 can obtain a function value corresponding to the first attribute information based on the first attribute information and the first function and to obtain a function value corresponding to the second attribute information based on the second attribute information and the second function.

The determination portion 24 can determine from the function values corresponding to the first and the second attribute information whether the first and second attribute information of the UGC message meets a preset condition, and if so, notify the sending portion 25 to send the UGC message to the cache memory of the server.

The sending portion 25 can send the UGC message to the cache memory.

The first attribute information can be time attribute information, including but not limited to the time of the UGC message generated.

The second attribute information can be state attribute information, including various sub-state attribute information. For example, the first sub-state attribute information of the UGC message can represent the UGC is in a normal state or in a deleted state. For example, the second sub-state attribute information of the UGC message can represent the UGC message is in an air-interface forwarded state, in an original state, in a comment state or in a broadcast state etc. For example, the third sub-state attribute information of the UGC message can be priority message. In an example, UGC messages can be classified into different priority classs based on the impact factor of different generators. UGC messages published by different message generators correspond to different priority classs, including first-class message, second-class message and the like. The message generators can be any users who can generate messages, such as an original generator, a commentator or a broadcaster of messages. The impact factor of a message generator includes and is not limited to the numbers of fans and friends of the message generator.

The first function can be a piecewise function corresponding to the first attribute information and related to the time attribute.

The second function can be a piecewise function corresponding to the second attribute information and related to the message state attribute and includes sub-functions corresponding to various sub-state attribute information.

The apparatus of FIG. 2 can further include a receiving portion 26, a retrieval portion 27 and a third acquisition portion 28.

The receiving portion 26 can receive from a client application a request message for reading the UGC message.

The retrieval portion 27 can, upon the request message for reading the UGC message being received by the receiving portion 26, retrieve in the cache memory to find the UGC message.

The third acquisition portion 28 can obtain the UGC message from a disk of the server when the UGC message cannot be retrieved by the retrieval portion from the cache memory of the server.

In an example, the determination portion 24 can determine whether the first and second attribute information of the UGC message meets the preset condition by judging whether a sum of the function values corresponding to the first and second attribute information is greater than a preset threshold, and if yes, it is determined that the first and second attribute information of the UGC message meets the preset condition.

In an example, the function value corresponding to the first attribute information can be that corresponding to the initial publishing time attribute information of the message, the function value corresponding to the second attribute information can be the accumulation of function values of sub-functions corresponding to the sub-state attribute information.

In an example, the apparatus can further include a monitoring portion 29 and a cleaning portion 20.

Before the UGC message is added to the cache memory of the server, the monitoring portion 29 can determine whether the cache memory reaches a preset capacity threshold and send a cleaning instruction to the cleaning portion 29 in a case that the cache memory reaches the preset capacity threshold.

Upon receiving the cleaning instruction from the monitoring portion 29, the cleaning portion 20 can calculate a hash value corresponding to the UGC message based on Identifier (ID) of the UGC message, retrieve in the cache memory to find all the UGC messages having a hash value equal to the calculated hash value, for each of the retrieved UGC messages, calculate a sum of function values of the retrieved UGC message, and delete, from the cache memory, an UGC message having a minimum sum of function values.

Since the capacity of the cache is limited, the first attribute information of the message, i.e., the time attribute information, will change over time, and more and more UGC messages will be added to the cache, it is necessary to clean the UGC message in the cache memory and delete the UGC message having the same hash value and the minimum sum of function values in the cache memory in order to add a new UGC message when the cache memory reaches a certain capacity threshold.

Figure 3:
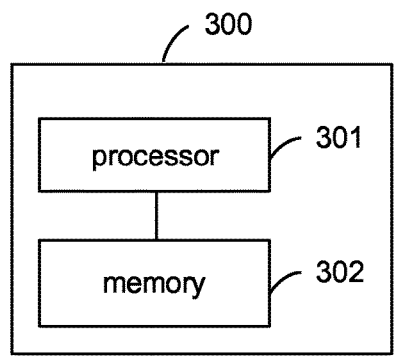
FIG. 3 is a block diagram illustrating a server for caching UGC messages according to some embodiments.

FIG. 3 is a block diagram illustrating a server for caching UGC messages according to some embodiments. The server may include the apparatus illustrated in FIG. 2 and adopt the method illustrated in FIG. 1. In an example, the server 300 can include a processor 301 and a memory 302. The memory 302 can include a cache memory and a disk.

In an example, the processor 301 includes hardware for executing instructions, for example, one or more computer programs. The processor 301 may retrieve instructions from the memory 302 and execute them. The processor 301 may be implemented as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform one or more of the method steps as described in the specification.

In an example, the memory 302 may store instructions for the processor 301 to execute or data for the processor 302 to operate on. In an example, the memory 302 may include random access memory (RAM), which may be dynamic RAM (DRAM) or static RAM (SRAM) as desired. Additionally, the memory 302 may include storage for storing data and instructions, such as read-only memory (ROM), such as mask-programmed ROM, programmable ROM (PROM), erasable PROM (EPROM), electrically erasable PROM (EEPROM), electrically alterable ROM (EAROM), or flash memory. In an example, the storage may be internal or external to server 300. In an example, the storage stores instructions for performing one or more of the method steps as described in the specification. As an example and not by way limitation, the server 300 may load instructions from the storage or other sources (for example, remote sources) to the RAM, and then the processor 301 may retrieve the instructions from the RAM to execute them. In an example, the memory 302 may include one or more memories.

Although this disclosure describes and illustrates a particular computer equipment having a particular number of particular components in a particular arrangement, any suitable computer equipment having any suitable number of any suitable components can be contemplated.

Herein, one or more non-transitory computer readable storage media may be contemplated for implementing any suitable storage. In an example, a non-transitory computer readable storage medium may implement at least some portions of the memory 502 or 602. The non-transitory computer readable storage medium may be implemented as a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a SECURE DIGITAL card, a SECURE DIGITAL drive, or any other suitable computer-readable storage medium. The non-transitory computer readable storage medium may carry instructions, which when executed, causes at least one of the data traffic prompting methods provided in the disclosure to be performed.

While the foregoing disclosure discusses illustrative aspects and/or embodiments, it should be noted that various changes and modifications could be made herein without departing from the scope of the described aspects and/or embodiments as defined by the appended claims.

The invention claimed is:

1. A method for caching User Generated Content (UGC) messages, comprising:
at a server,
acquiring first and second attribute information of an UGC message independent of the content of the UGC message for determining whether to cache the UGC message for future access by users of a service provided by the server, wherein the first attribute information is time attribute information and the second attribute information is state attribute information distinct from the time attribute information;
obtaining, based on the first attribute information and a preset first conversion function, a function value corresponding to the first attribute information;
obtaining, based on the second attribute information and a preset second conversion function, a function value corresponding to the second attribute information; and
determining whether the first and second attribute information of the UGC message meets the preset condition by judging whether a sum of the function values corresponding to the first and second attribute information is greater than a preset threshold, and if yes, determining current reading demands of the UGC message meet a present condition, and adding the UGC message to a cache memory of the server,
wherein for the UGC message,
the first attribute information comprises time attribute information representing the time when the UGC message is generated;
the second attribute information comprises state attribute information comprising first, second and third sub-state attribute information;
the first sub-state attribute information represents that the UGC message is in a normal state or in a deleted state, each corresponding to a function value different from one another;
the second sub-state attribute information represents that the UGC message is in an air-interface forwarded state, in an original state, in a comment state or in a broadcast state, each corresponding to a function value different from one another; and
the third sub-state attribute information represents priority information of the UGC message, each piece of priority information corresponding to a function value different from one another.

2. The method of claim 1, further comprising: prior to acquiring the first and second attribute information of the UGC message,
receiving, from a client application, a request message for reading the UGC message; and
obtaining the UGC message from a disk of the server when the UGC message cannot be retrieved from the cache memory of the server.

3. The method of claim 1, further comprising:
returning the UGC message added to the cache memory of the server to a client application.

4. The method of claim 2, further comprising:
returning the UGC message obtained from the disk of the server to the client application.

5. The method of claim 1, further comprising: prior to adding the UGC message to the cache memory of the server,
determining whether the cache memory reaches a preset capacity threshold; and
in a case that the cache memory reaches the preset capacity threshold,
calculating a hash value corresponding to the UGC message based on Identifier (ID) of the UGC message;
retrieving, in the cache memory, all the UGC messages having a hash value equal to the calculated hash value;
for each of the retrieved UGC messages, calculating a sum of function values of the retrieved UGC message; and
deleting, from the cache memory, an UGC message having a minimum sum of function values.

6. An apparatus for caching User Generated Content (UGC) messages, comprising:
a processor; and
a memory, coupled to the processor, and including instructions that when executed, cause the processor to:
acquire first and second attribute information of an UGC message independent of the content of the UGC message for determining whether to cache the UGC message for future access by users of a service provided by the server, wherein the first attribute information is time attribute information and the second attribute information is state attribute information distinct from the time attribute information;
obtain, based on the first attribute information and a preset first conversion function, a function value corresponding to the first attribute information;
obtain, based on the second attribute information and a preset second conversion function, a function value corresponding to the second attribute information; and
determine whether the first and second attribute information of the UGC message meets the preset condition by judging whether a sum of the function values corresponding to the first and second attribute information is greater than a preset threshold, and if yes, determine current reading demands of the UGC message meet a present condition, and add the UGC message to a cache memory of the apparatus,
wherein for the UGC message,
the first attribute information comprises time attribute information representing the time when the UGC message is generated;
the second attribute information comprises state attribute information comprising first, second and third sub-state attribute information;
the first sub-state attribute information represents that the UGC message is in a normal state or in a deleted state, each corresponding to a function value different from one another;
the second sub-state attribute information represents that the UGC message is in an air-interface forwarded state, in an original state, in a comment state or in a broadcast state, each corresponding to a function value different from one another; and
the third sub-state attribute information represents priority information of the UGC message, each piece of priority information corresponding to a function value different from one another.

7. The apparatus of claim 6, wherein the memory further includes instructions when executed, cause the processor to: prior to acquiring the first and second attribute information of the UGC message,
- receive, from a client application, a request message for reading the UGC message; and
- obtain the UGC message from a disk of the apparatus when the UGC message cannot be retrieved from the cache memory of the apparatus.

8. The apparatus of claim 6, wherein the memory further includes instructions when executed, cause the processor to: return the UGC message added to the cache memory of the apparatus to a client application.

9. The apparatus of claim 7, wherein the memory further includes instructions when executed, cause the processor to: return the UGC message obtained from the disk of the apparatus to the client application.

10. The apparatus of claim 6, wherein the memory further includes instructions when executed, cause the processor to: prior to adding the UGC message to the cache memory of the apparatus,
- determine whether the cache memory reaches a preset capacity threshold; and
- in a case that the cache memory reaches the preset capacity threshold,
  - calculate a hash value corresponding to the UGC message based on Identifier (ID) of the UGC message;
  - retrieve, in the cache memory, all the UGC messages having a hash value equal to the calculated hash value;
  - for each of the retrieved UGC messages, calculate a sum of function values of the retrieved UGC message; and
  - delete, from the cache memory, an UGC message having a minimum sum of function values.

11. A non-transitory computer-readable storage medium including instructions that, when executed, cause the processor to:
- acquire first and second attribute information of an UGC message independent of the content of the UGC message for determining whether to cache the UGC message for future access by users of a service provided by the server, wherein the first attribute information is time attribute information and the second attribute information is state attribute information distinct from the time attribute information;
- obtain, based on the first attribute information and a preset first conversion function, a function value corresponding to the first attribute information;
- obtain, based on the second attribute information and a preset second conversion function, a function value corresponding to the second attribute information; and
- determine whether the first and second attribute information of the UGC message meets the preset condition by judging whether a sum of the function values corresponding to the first and second attribute information is greater than a preset threshold, and if yes, determine current reading demands of the UGC message meet a present condition, and add the UGC message to a cache memory, wherein for the UGC message,
- the first attribute information comprises time attribute information representing the time when the UGC message is generated;
- the second attribute information comprises state attribute information comprising first, second and third sub-state attribute information;
- the first sub-state attribute information represents that the UGC message is in a normal state or in a deleted state, each corresponding to a function value different from one another;
- the second sub-state attribute information represents that the UGC message is in an air-interface forwarded state, in an original state, in a comment state or in a broadcast state, each corresponding to a function value different from one another; and
- the third sub-state attribute information represents priority information of the UGC message, each piece of priority information corresponding to a function value different from one another.

12. The non-transitory computer-readable storage medium of claim 11, further including instructions when executed, cause the processor to: prior to acquiring the first and second attribute information of the UGC message,
- receive, from a client application, a request message for reading the UGC message; and
- obtain the UGC message from a disk when the UGC message cannot be retrieved from the cache memory.

13. The non-transitory computer-readable storage medium of claim 11, further including instructions when executed, cause the processor to:
return the UGC message added to the cache memory to a client application.

14. The non-transitory computer-readable storage medium of claim 12, further including instructions when executed, cause the processor to:
return the UGC message obtained from the disk to the client application.

* * * * *